United States Patent [19]
Graybill

[11] 3,807,144
[45] Apr. 30, 1974

[54] AIR RECTIFIERS, APPARATUS WITH PROCESS

[76] Inventor: Paul J. Graybill, 61 Sunset Hill Dr., Pine Orchard, Conn. 06405

[22] Filed: Jan. 31, 1972

[21] Appl. No.: 221,882

[52] U.S. Cl............................ 55/234, 55/6, 55/90, 55/103, 55/122, 55/126, 55/131, 55/155, 55/234, 55/260, 55/385, 55/418, 55/441, 55/445, 55/462, 55/485, 55/510, 55/524, 55/DIG. 24, 55/DIG. 28, 261/107
[51] Int. Cl............................................. B01d 47/00
[58] Field of Search ............ 55/6, 90, 260, DIG. 24, 55/103, 121, 126, 131, 155, 510, 524, 245, 233, 246, 244, 234, 229, 239, 240, 440, 441, 442, 443, 445, DIG. 28, 385, DIG. 27, 418, 441, 462, 485; 210/84, 304, 494; 261/107

[56] References Cited
UNITED STATES PATENTS

| | | | |
|---|---|---|---|
| 1,729,135 | 9/1969 | Slavson | 55/DIG. 28 |
| 1,743,675 | 1/1930 | Jordahl | 55/524 X |
| 2,002,165 | 5/1935 | Winslow | 55/233 X |
| 2,647,637 | 8/1953 | Leet | 210/494 X |
| 3,397,514 | 8/1968 | Rothfeld et al. | 55/239 X |
| 3,529,719 | 9/1970 | Graybill | 210/73 |
| 3,563,029 | 2/1971 | Lowes | 55/239 X |
| 3,450,264 | 2/1969 | Graybill | 210/304 X |
| 3,616,606 | 10/1969 | Vincent | 55/154 X |
| 1,764,250 | 6/1930 | Falkenthal | 55/127 |

FOREIGN PATENTS OR APPLICATIONS

| | | | |
|---|---|---|---|
| 123,499 | 11/1944 | Australia | 55/234 |
| 552,950 | 4/1943 | Great Britain | 55/236 |
| 682,131 | 11/1952 | Great Britain | 55/131 |
| 701,975 | 1/1954 | Great Britain | 55/131 |
| 798,458 | 2/1957 | Great Britain | 55/246 |
| 880,018 | 12/1942 | France | 55/245 |

*Primary Examiner*—Dennis E. Talbert, Jr.
*Assistant Examiner*—Neil F. Greenblum

[57] ABSTRACT

A permanent air rectifier apparatus and process, which separates both micronic and submicronic contaminants from an air stream passing therethrough.

Upwardly positioned perforations in a series of vertical, continuous, confined, and capillarily oil soaked attractor baffles therein, which baffles are bottomly spaced by porous separators positioned in an oil sump, afford means to inertially dislodge, electrostatically attract, surface cohere and oil bond said contaminants to said attractors, as a result of the parabolic profile and laminar flow streams with their resultant inertial forces in the severe side swirls of the jet streams as they pass through said perforations.

6 Claims, 5 Drawing Figures

PATENTED APR 30 1974  3,807,144

AIR RECTIFIERS, APPARATUS WITH PROCESS

RELATED APPLICATIONS

This application discloses certain improvements and variations on my Air Rectifier Apparatus with Process, as disclosed in a previous application Ser. No. 135,847 filed Apr. 21, 1971, which application is being processed.

This instant application adds to the previous structure and process, (1) perforations in the oil soaked attractors, (2) parabolic profile jet streams with laminar flow and side swirls, (3) an equalization chamber, (4) a turbulence chamber with slanted floor for oil drain back into the sump, (5) a vastly different general flow pattern fully circumferential toward the center, and (6) a reverse flow pattern in the entering air which eliminates most snow, rain, and other heavy contaminants before they enter the Rectifier. This is a decided advance over the previous structure.

BACKGROUND OF THE INVENTION

The removal of both micronic and submicronic comtaminants, both wet and dry, from an air stream has always been a major problem in industry and transportation, and the failure to do so, is perhaps the most disastrous single factor in motor maintenance as well as the maintenance of compressors and other oil or air using equipment. We are here, however, chiefly concerned with air rectifiers for internal combustion motors, even though the same process and apparatus with variations may serve other type operations equally well.

A great number of devices have been developed and used in an attempt to solve this urgent problem, but none have been highly successful as regards long life and efficiency under all conditions, together with assurance against catastrophic failure and/or high initial installation, maintenance, and labor costs.

These air cleaners have been essentially of two types: (1) the wet or oil bath type, and the other, (2) the dry porous paper element type. Some applications have employed combinations of several variations of these two types in multiple phase units although a third type, using dry centrifugal cells, has also been in limited use but will not be considered here.

The Oil Bath Type has employed either fibre or metal mesh elements superimposed above the oil bath chamber through which mesh the air must flow upwardly. The mesh is kept oiled by the upward suction of the oil from the chamber below by the air flow. This, then, constitutes a two phase cleaning action. The first phase is accomplished by an abrupt reversal of the air stream at the surface of the oil to purge, by inertia, any large contaminants, including water, these being forced out of the air, downwardly into the oil, as the air is making its abrupt turn. The second phase is the passage of the air upwardly through the oil soaked mesh which by small patterns of reverse flow, centrifugal action, eddying and plain surface contact, even the very fine contaminants are cohered to the oil on the mesh, where they are held and may be at least partially drained back into the oil chamber of the unit by the dripping oil. Tests have shown that in ideal conditions, where idling is not too excessive, these units may remove as much as 90 percent of all abrasives above 10 microns in size and 98 percent of all contaminants irrespective of size. This of course is not ideally sufficient both as to the amount and size of the contaminants since it is the 5 to 10 and larger micron silica particles which most effectively destroy equipment and motors. Some authorities state that 258 grams of such contaminants will effectively destroy a motor regardless of when or at what rate they are ingested, hence the importance of removing essentially all of such contaminants. However, the oil bath cleaner is certainly a great step forward in keeping air free of these contaminants especially if it were possible to overcome certain intrinsic disadvantages and faults therein.

These disadvantages of the Oil Bath Cleaner are: (1) the necessity of keeping the oil at the proper level in the oil chamber since in the case of too much oil, some, is drawn into the motor with considerable contaminants therein, and on the other hand if there is too little oil the mesh dries out completely, hence little cleaning occurs, (2) the problem of snow, rain, or other water entering the chamber as it is removed from the air stream, thus raising the oil level and again causing the oil to be drawn completely out into the motor, dirt and all, as stated above, with bad effects on the motor and also thus completely limiting the effectiveness of the unit, (3) the necessity of complicated maintenance programs, since frequent inspection to maintain oil level, regular removal and cleaning of the mesh and cleaning of the oil chamber and replacing the oil are necessary, (4) also the dropping of the efficiency of the unit during idling, due to lack of inertial force for purging contaminants and/or picking up oil to be carried into the mesh, which without this oil, the mesh becomes dry and ineffective which is a serious handicap, and (5) in extremely large motors wet cleaners are cumbersome to install and handle.

Some of the specific advantages of the Oil Bath Filter are: (1) they are generally smaller and can be positioned under the hood of a vehicle except as stated in extremely large motors, (2) they are relatively inexpensive to maintain, the oil is readily available and it is cheap and the mesh need not be replaced, only cleaned, (3) there is no continuous porous filter medium to replace, clean, or to rupture and thereby pass dirt, (4) wet cleaners do not markedly change the fuel-air ratio by becoming clogged, which is important in the prevention of carbon and pollutants and the maintenance of good mileage and clean exhaust and (5) they do not require an inventory of filter elements to be kept on the shelf for replacement.

DRY TYPE FILTERS

Dry filters have been used in a large variety of configurations and multiple arrangements with and without centrifugal, matt, or pleated paper precleaners. Paper element filters may be mounted in series or parallel, one within the other or one above the other. A matt element may be installed as a precleaner on the assumption that it will catch a greater percent of the fine particles and allow the passage of the larger particles since the fine particles clog the porosity of the regular paper elements faster than the larger particles, which instead pile up on the paper element and allow the air to flow through more readily than do fine particles. When centrifugal precleaners are used as much as 90 percent of the large contaminants are eliminated before going into the pleated paper element or elements, however the remaining fine particles are consequently still present to plug the fine porosity of the paper element. It should be noted that some manufacturers of paper elements are now oiling said elements, which of course will attract and hold contaminants more readily but will also become clogged more easily than the regular resin treated paper; it can be said however, that as far as cleaning is concerned, the oil adds to the performance. Some dry filters have dust cups to catch any dislodged contaminants, these to be manually removed, and some have dirt extractors articulated to the exhaust of the motor to dispose of any accumulated contaminants, also some as stated have moisture eliminators, as well as these dust precipitators mounted in front of the pleated paper elements in an attempt to preclean the air/or remove water or snow.

Under ideal conditions dry filters are even more efficient than oil bath cleaners and may remove as much as 99 percent or more of all contaminants above 5 microns in size, which of course is a great advantage since contaminants below the 5 micron level are not generally abrasive, hence dry filters are preferred, for this reason by some users, even though they have serious shortcomings as will be indicated in the following.

Some disadvantages of the Dry Filters are as follows: (1) the replacement or cleaning of the porous element with its inventory and labor costs which changing or cleaning involves, also the ever present problem of the breakage of the element, unless great care is taken. Also the loss of efficiency of the element when cleaned is a problem and has to be considered since perfect cleaning is impossible, and even slight contamination of the element restricts the air flow to the motor changing the air-fuel ratio and causing imperfect combustion. Indicators are sometimes used to show this pressure differential in an attempt to control this disastrous fault, (2) water, snow, or extreme moisture decreases the efficiency of the paper element and may even cause mud or ice to form and completely stop the air flow, and stall the motor, (3) ordinary fatigue from engine vibration may cause a paper element to fracture with disastrous results to the motor, and (4) dry filters are quickly clogged by exhause contaminants, smoke, and especially by oil. In fact, where oil is present, dry filters cannot be used.

Some special advantages of dry filters are as follows: (1) dry type filters may generally be mounted in any position while wet filters must be mounted vertically, (2) a restriction guage may be mounted in the cab to assist in determining service intervals, and (3) additional stages and precleaners may be added, as stated, to meet extreme needs.

With the foregoing in mind it can be readily seen that much needs to be accomplished in air cleaners to overcome the shortcomings of those in use both wet and dry. The greatest faults might be said to be, (1) restriction of the air and change in the air-fuel ratio when the element is even partially clogged, which ratio must be kept constant under all and every circumstance if proper motor performance is to be maintained, (2) the loss of efficiency by water, mud, or ice in extreme conditions, (3) the fracturing of the element while cleaning or from fatigue during operation, and (4) the loss of oil and drying out of the maize in the case of the Oil Bath type, and (5) the cost in materials, labor, down time as well as the inconvenience.

It should be pointed out that cleaning the intake air is of the utmost importance since some of the abrasive contaminants that are present in the air intake when drawn into the combustion chamber when ignition takes place, are blasted like bullets into the oil on the side walls of the combustion chamber and are there held in the oil in the upper part of the cylinder wall to do their destructive work in wearing the pistons, rings, and cylinder walls, especially if they are above 5 microns in size, as they are violently rubbed up and down by the piston before they finally work downward past the rings into the oil in the crankcase where they can then be removed by filtering the crankcase oil. However, at that point they have already done most of their damage. It should be also realized that particles of silica are the most difficult contaminants to remove when present in the crankcase oil, they do not ionize easily and are not electrostatically attractable to be removed by electrostatic attraction, and because of their light specific gravity they do not settle readily. Hence, they should by all means be removed from the air before entering the combustion chamber. In addition it should be noted that currently used oil filters which have absolute ratings of as high as 20 to 40 microns will not effectively remove these contaminants from the crankcase oil and they remain in the oil to be recirculated time after time until they are ground up by the motor, and it is these contaminants that effectively destroy a motor, thus the importance of a proper Air Rectifier to reduce this hazard.

In view of the above facts it would seem that air cleaners based on either a wet bath or on porosity as are the present cleaners, are to these extents, inadequate and that an apparatus and process that would correct these shortcomings, would do exactly what these cleaners fail to do and would not function as they do. In fact, present cleaners perform exactly contrary to the way an ideal Air Rectifier would perform in most respects. A proper Air Rectifier would not have a porous element, thus eliminating natural clogging or extreme clogging by rain, snow, or mud; also thus eliminating the problem of fracturing the element, as well as the expense of element changing. A proper Air Rectifier would also avoid the problem of catastrophic failure as in Oil Bath Cleaners when too much or too little oil is in the oil chamber.

It should be noted here that clogging is very disastrous. A clogged paper filter results in the use of more fuel, the creation of additional carbon, the contamination of the spark plugs, the corrosion and sticking of valves, the contamination of crankcase oil, increased motor wear, and it also adds pollution to the exhaust. Hence this problem must be solved by a proper Air Rectifier which can not clog, thus changing the air-fuel ratio.

SUMMARY OF THE INVENTION

In consideration of the above factors the instant Air Rectifier Apparatus with Process was developed over a period of years employing any and all usable physical principles and functions which could clean air effectively and at the same time obviate the shortcomings of current filters both wet and dry, employing such physical laws as gravitational, centrifugal and inertial forces, aerodynamic-turbulance, eddying, surface cohesion, liquid bonding and electrostatic attraction, these processes being accomplished by drawing the intake air of a motor through said apparatus which was designed to be superimposed on the motor intake system. The apparatus consists of a casing which contains a lower oil sump area downwardly positioned about the outer portion thereof, and an upper air circulating area. Within both the sump and circulating area above the sump is positioned a doughnut shaped attractor element formed of concentric attractor baffles, these being perforated and separated to allow the passage of the air therethrough, these being also spaced at the lower portion thereof by porous dividers which are positioned within the oil sump area of the Rectifier casing to form channels between the upper attractor baffles. Inwardly from the said attractor element the floor of the Rectifier is elevated to form with the lid of the Rectifier, a turbulence chamber which has a medial circular baffle extending downward from the lid to form a reversal in the air stream as it flows to the central motor intake where an upwardly extending flange creates a second reversal as the air enters therein.

The baffle attractors are capillarily oil soaked and as the air flows about these and through the perforation therein, parabolic jet flow streams are formed creating laminar flow and severe side swirls and eddies which insure surface contact over the entire area of the baffles, thus allowing surface cohesion, electrostatic attraction and liquid bonding of the contaminants thereto. These processes attract both the larger as well as the submicronic contaminants and clean the air of essentially all contaminants which may harm a motor without getting clogged or having to be frequently cleaned or changed.

These and other benefits and advantages will be better understood when reference is made to the following description of the drawings:

DETAILED DESCRIPTION OF THE RECTIFIER AND PROCESS

Figures 1, 2, 3, 4, 5:
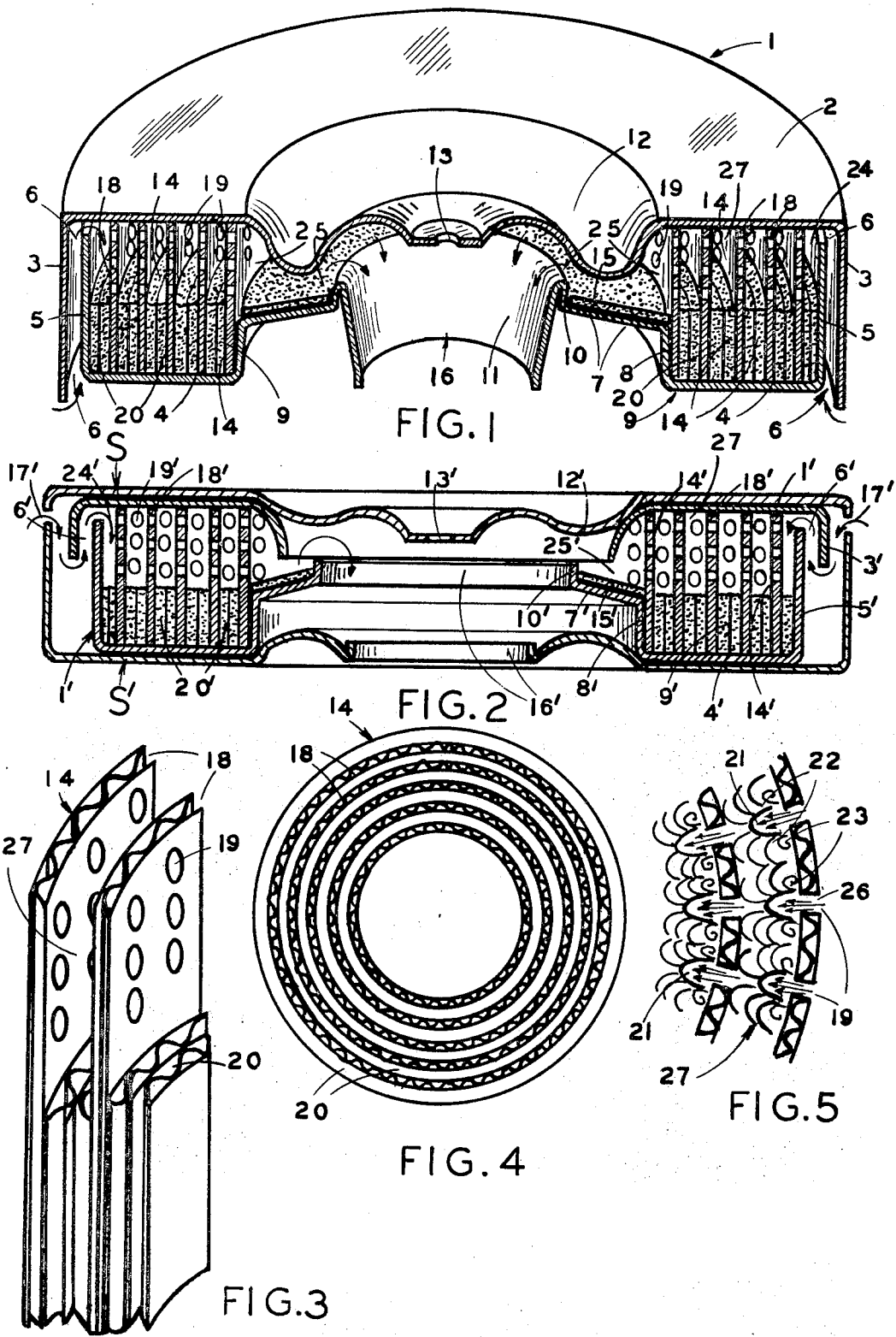
FIG. 1 is a vertical, perspective, cross-sectional view of a simple circular configuration of the Rectifier, showing the lid with flange, the attractor baffle element and the lower floor section with upward flange, sump section, elevated plateau, and exit flange.
FIG. 2 is a simple cross-section of a variation of the Air Rectifier as the simple structure is formulated and used as an insert in a conventional air cleaner casing.
FIG. 3 is a greatly enlarged portion of a section of two convolutions of the attractor baffle showing the perforations, and the separator honeycomb dividers.
FIG. 4 is a miniature top view of the attractor baffle element, showing the attractor baffles and the separator honeycomb dividers.
FIG. 5 is an enlarged sectional view of a portion of two of the attractor baffles showing the apertures and the jet flow streams with parabolic profile, laminar flow, and side swirls insuring surface contacting action for separating contaminants.

Referring then to the drawings, FIG. 1 is a medial, cross-sectional, perspective view of a simple circular configuration of the apparatus and shows a two piece construction of the casing 1, this casing may be made of sheet metal or the like. The upper portion consists of a removable lid 2, with a continuous downwardly extending peripheral lid flange 3 thereabout, said lid 2 also having a downwardly extending contour thereon forming lid baffle 12 which extends partially downward therefrom. Said lid 2 also has a centrally positioned orifice 13 to afford means of articulating said lid to the motor intake. The lower portion of said casing 1 consists of a contoured floor 4 having an upwardly extending continuous, peripheral side wall 5 thereabout, this side wall extending partially upwardly within the confines of lid flange 3 and lid 2, forming an air flow path 6, through which air may enter said apparatus.

Floor 4 also has a slanting elevated plateau section 7 therein with a sump side wall 8 articulating said elevated section 7 to the lower portion of floor 4 thus forming the sump area 9 therein. Said elevated section 7 also has an inner intake baffle 10 extending partially upward toward lid 2, baffle 10 having a flange 11 articulated therein said flange extending downwardly forming outlet 16 to afford articulating means to the motor intake.

Also shown in FIG. 1, positioned within casing 1, is perforated attractor element 14 through which upper perforated baffles the air must flow, said perforated attractor baffles being separated at their bases by honeycomb separators 20, this attractor baffle element being positioned in sump 9 extending upwardly to lid 2, the outer attractor of said element forming with side wall 5 the walls of equalization chamber 24, which chamber equalizes the air flow before it passes through the perforations 19 in said baffles. Also shown is porous floor element 15 on elevated plateau 7 which porous floor element bonds any contaminants and retrieves and drains back into sump 9 any oil which is cast thereon by inertial action as the air stream reverse flows about lid baffle 12 and intake baffle 10, FIG. 2 is likewise a cross sectional view, this of a modified configuration of the Rectifier with the attractor baffle element 14 in place, where it is formulated to be used as an insert in a conventional air cleaner shell. S & S' are the lid and body of the conventional air filter casing, these are separated slightly to allow air to enter at air intake space 17'. The insert Rectifier 1' is otherwise essentially similar to that of FIG. 1, FIG. 3 shows a detail of attractor element showing attractors 18 with perforations 19, and honeycomb separators 20 which occupy the oil sump area 9, said attractors 18 and honeycomb separators 20 are formed of corrugaged paper, which is especially effective for this process since the inner corrugations are always clean and cannot restrict the capillary attraction of the oil, FIG. 4 is a miniature top view of attractor baffle element 14 showing the continuous concentric perforated attractors 18 and the honeycomb separators 20, FIG. 5 is a schematic view of a section of attractor baffles 18 cut through perforations 19, showing the pattern of the jet streams 26 passing therethrough, with parabolic profile 21, laminar flow streams 22, and side swirls 23.

DESCRIPTION OF THE OPERATION AND PROCESS

The operation of the Rectifier and Process are as follows: air which is being drawn inwardly at terrific speed by the vacuum of the operating motor, into the carburetor or the intake manifold, in the case of Diesel Motors, must pass through the Rectifier. It enters air flow path 6 between lid flange 3 and floor flange 5 and is drawn upwardly and over the top of floor flange 5 and down into equalization chamber 24 in an abrupt 180° turn. Inertial forces separate a great portion of the heavier contaminants by casting them against attractor 18 where they are oil bonded and held to said attractor.

It should be noted here that all air as it enters the Rectifier is drawn about the lower edge of lid flange 3 which is slightly lower than floor 4 and since the air is flowing inwardly, not outwardly, it must make an abrupt turn to enter therein. Tests have shown that essentially all water, rain, snow, and some heavy materials are expelled from the thin air stream at that point since they are not able to negotiate the turn, and consequently do not enter the Rectifier at all.

As the air is equalized in equalization chamber 24 it must again make a 90° turn to enter perforations 19. Here it not only dislodges an additional amount of contaminants as a result of the centrifugal and inertial action but in addition as it churns about in equalization chamber 24 it loses a considerable amount of small micronic and submicronic contaminants by surface contact, cohesion and electrostatis attraction to the side walls of the equalization chamber.

The air then enters the multiple perforations in the first attractor, subsequently passing through the next inner channel 27 and then on through other perforations and other channels with terrific cleaning actions taking place until it has passed through all of the attractors and channels and enters turbulence chamber 25 where the total air stream is again consolidated and deflected downward about lid baffle 12 making an abrupt turn at oil soaked floor element 15 to negotiate intake baffle 10, this action finally removing any possible remaining heavy contaminants including any oil particles that may have become airborne. They are shunted against said floor element 15 where they are held. The oil, if any, is then drained back into sump 9 as a result of the slant in the floor of the turbulence chamber.

By observing FIG. 5 which is a schematic view of a section of attractor baffles 18 cut through perforations 19, it is apparent that extreme activity takes place in the air stream as a result of the jet stream 26. As jet stream 26 passes through the perforation, it emerges with a parabolic profile 21 with laminar side flow streams 22 which terminate in side swirl eddies 23, which side swirls insure surface contact of the flowing air over the entire back surface of the first attractor 18 and the front side of the second attractor 18, on both surfaces contaminants are dislodged by inertia or electrostatic attraction since these actions are very severe.

This action separates contaminants that are large enough to be frictionally engageable by the movement of the air in the laminar flow-stream since they are shunted to the outside of the air stream away from the center of the parabolic profile as a log is dislodged from the center of a stream since the center flows faster than each slower successive lamina thereof, one side of the log flows faster than the other, thus it is nudged out of the center into the side eddies. These contaminants are then likewise caught in the side swirls of the air stream and are carried into the eddies and against the attractors where they are oil bonded thereto, while the cleaner air flows onward to enter the apertures in the next inward attractor. The action is repeated at each attractor and cleans the air of essentially all contaminants before entering turbulence chamber 25.

The sub-micronic contaminants are too small to be removed by the combined actions of friction, inertia and gravity but they are cast against the oil film on the surfaces of the attractors where they are captured by surface contact and bonding or by electrostatic attraction since all entities of molecular size have a proclivity to acquire an ionic charge of static electricity and become adsorbants and are thus attractable to any material of the opposite polarity. Oil is a natural attractor of carbon, silica, $H_2O$ and many other substances and is ideal for use in the instant Rectifier since oil travels easily by capillary attraction to keep all parts oil soaked, and oil also has strong surface tension sufficient to engulf contaminants and keep them secured. As previously stated the buildup of contaminants on the attractors may become very thick but the oil film continues to engulf and bond any newly captured particle thus creating an external oil film at all times thereon, keeping the unit at peak efficiency as long as there is oil in the sump of the Rectifier. This action is assured as a result of the use of corrugated paperboard since the inner honeycomb structure does not become clogged but remains clean at all times and allows the upward surface flow of oil by capillary attraction. Tests have indicated that in normal use on an automobile, a pint of No. 30 or No. 40 oil should be added to the Air Rectifier every 20,000 or 30,000 miles or in short run driving, every year. Adding this oil constitutes the total maintenance necessary in the use of the Rectifier unless one wishes to remove the element and clean it in a solvent at yearly intervals or so. In extreme conditions, like farm tractor usage and the like, one might desire to wash the element at more frequent intervals since it might be possible to impede the circulation efficiency of the attractors even though they do not clog as far as the direct air flow is concerned.

To recapitulate briefly, air which is being drawn through the Rectifier passes inwardly about the lower edge of the lid flange making a 90° turn thus dislodging water, snow, and other heavy contaminants. It then enters the air flow path between the lid flange and floor flange of the Rectifier body and flows upwardly and over the top of said floor flange and enters the air equalization chamber. This equalization area is sufficiently wide and deep to equalize the air flow before it enters inwardly into the perforations in the baffles. This entering air is therefore abruptly reversed from an upward flow to a downward flow, a 180° turn, which naturally dislodged a great percent of the remaining large contaminants as a result of inertial force, casting them against the inner wall of the equalization chamber which wall is also the first of the perforated concentric attractor baffles through which the air must flow. The oil on the oil soaked wall or baffle, when a particle strikes it, immediately seizes said particle and holds it in an oil bond by forming an oil film thereover, thus forming an oil film for succeeding particles to be seized, and although finally building up a heavy coating of contaminants, is consistently able to continue its operation of liquid bonding as a result of the capillary attraction of the oil from the sump of the Rectifier upwardly through the porous attractor baffles.

It should be noted here that not only are the inertially dilodged heavy particles caught in this oil film and separated but submicronic particles, as small as those in smoke, which naturally carry an ionic charge of static-electricity thereon are electrostatically attracted to the oil film and are also held by this surface cohesion as they come into close proximity to the oil film.

This partially cleaned air is then drawn through the perforations in the concentric perforated baffles and finally into the turbulence chamber where it is reverse flowed under and over the baffle extending down from the lid and the baffle about the motor intake, with gravitational and inertial forces and electrostatic attraction continuing to bring both small and large contaminants into contact with the oil film on the various parts of the Rectifier where they are liquid bonded, surface cohered and permanently held.

It should be pointed out that as the air is drawn through the perforations in the attractor baffles very important processes continue to clean the air. As air flows through a perforation a jet stream is created, having a parabolic profile with the center flowing faster than the concentric lamina in the stream. This action shunts any contained particles which have a heavier specific gravity than the air, toward the outside of the stream in an eddying effect. These eddies creating a centrifugal action, carry these side-swirls backward against the surrounding surface of the attractor through which it has just past, casting any contaminants against these surfaces or bringing them sufficiently close where they can be electrostatically attracted thereto. Also the jet stream creates following flow streams of air which likewise contact the next inwardly attractor baffle through which perforation the air must subsequently pass, creating a similar cleaning action. This action is repeated at each concentric baffle until the air finally flows into the turbulence chamber where it passes as stated under the upper lid baffle and over the lower motor intake baffle, here any remaining contaminants are cast downwardly by gravitation and inertia onto the oil coating of the floor of the chamber which may have an oil soaked porous element thereon. Here the contaminants are permanently held by oil bonding.

It has been demonstrated in runs up to 150,000 miles that no appreciable contaminants are able to negotiate these very potent forces through more than three baffles before being eliminated, the inner two baffles of a five ring configuration remained essentially clean. This configuration then results in an Air Rectifier that is permanent, effective, economical, essentially free of service, (except the addition of a small amount of oil every 20,000 miles or so) and is very convenient. Also as a by-product, since it cannot clog, it keeps the air fuel ratio constant, insuring good clean combustion thus preventing air pollution; it prevents wear in the cylinders and rings of the motor insuring long motor life as well as clean operation; it keeps the motor oil free of airborne contaminants, thus maintaining the lubricating qualities of the oil, these resulting in increased mileage and a great saving in motor replacement, maintenance, and fuel costs.

The features of the instant Rectifier Apparatus and Process are new, novel and useful, they constitute a decided advance in the cleaning of intake air. These features used in toto, or in part, or in various sizes or different arrangements or with altered parts serving the same purpose, are within the spirit of my invention. The embodiments shown do not limit the broad features of the apparatus and processes claimed, but are only exemplary and other embodiments including modified forms or shapes of these essential parts and processes may be resorted to without departing from the spirit of my invention or the scope of the subjoined claims.

I claim:

1. An Air Rectifying apparatus for the removal of both micronic and submicronic solid contaminants such as carbon, dust, sand, hail, or snow, as well as any liquid contaminants such as water or rain, from an air stream flowing therethrough, said apparatus consisting of a casing formed of rigid nonporous material, said casing containing therein an attractor element, said element consisting of a multiple number of porous essentially parallel and perforated, liquid soaked, attractor baffles, said baffles so confined, spaced and positioned in said casing that said air stream is caused to flow through said perforations, said casing also having inlet means for said air stream to enter into, and outlet means for said air stream to exit therefrom, after passing through said perforations in the successive oil soaked attractor baffles;

said attractor baffles being liquid soaked by capillary attraction from an associated liquid supply;

said liquid supply being provided by a bottomly positioned liquid tight and liquid filled sump portion of said apparatus into which sump the lower portion of said attractors are positioned;

said casing consisting of a circular lid having a peripheral flange extending downwardly thereabout, and a circular floor with a peripheral floor flange extending upwardly thereabout, said floor flange extending part way upwardly within the confines of said lid flange and said lid, to form an air flow channel through which the entering air must pass between the said flanges and over the upper end of said floor flange;

said perforated attractor baffles being separated and spaced by narrow porous separators such as honeycomb like corrugated paper strips, along and between the lower lateral edges thereof, said separators extending only part way upwardly therebetween, said separators and said attractor baffles in combination forming said attractor element;

said honeycomb separators being therefore bottomly positioned between said vertical perforated attractor baffles, the lower portion of said baffles and the complete separators being positioned in the liquid tight and liquid filled sump portion of said casing with the upward portion of said perforated attractor baffles extending upwardly and contacting the lid of said casing, thus being fully positioned between the floor of the sump and the lid of said apparatus;

said apparatus also having an equalization chamber into which the air stream flows and equalizes before passing through the perforations in said attractor baffles, said chamber being positioned immediately inwardly and adjacent to said peripheral floor flange;

said floor of said apparatus being contoured to form an outwardly positioned deeper circular sump area and an inwardly elevated circular plateau area, which plateau area forms the floor of a turbulence chamber, also said floor having contoured therein about its inner terminal edge and upwardly extending inner flange, said lid thereof also being contoured on a portion thereof, part way downward into said turbulence chamber to form a lid flange under which said air flow must pass as it moves inwardly before passing over said upwardly extending floor flange, said apparatus also having a downwardly extending inner flange articulated to said inner floor flange to provide articulating means to a motor intake.

2. The apparatus of claim 1 having a porous element covering said elevated, circular plateau portion in said turbulence chamber.

3. The apparatus of claim 1 in which the floor of said turbulence chamber is slanted upwardly from said sump side wall to said upwardly extending inner flange.

4. The apparatus of claim 1 in which said casing is formed of sheet metal.

5. The apparatus of claim 1 in which said attractor baffles are formed of corrugated paperboard.

6. An Air Rectifying Process for removing both solid and liquid contaminants from an air stream which is rapidly passing through an appropriate apparatus, said process consisting of a number of physical principles and functions such as inertial, centrifugal and gravitational forces together with aerodynamic turbulence and eddying, these used in conjunction with surface cohesion, electrostatic attraction and liquid bonding which processes are accentuated by passing said air stream through the perforations of confined attractor baffles within said apparatus thus forming jet air streams with parabolic profile and laminar air streams, with severe side swirls and eddies, these causing said air streams to dislodge, surface contact and oil bond and hold said contaminants to said attractor baffles, in which process an air stream is passed about an abrupt turn upwardly into and through an air flow channel and again abruptly turned in a 180° turn downward into an equalization chamber at which turns inertial, centrifugal and gravitational forces dispel heavy contaminants out of said air stream against said liquid soaked surfaces of said apparatus where they are liquid bonded thereto, also subsequently passing said air stream through a series of perforated attractor baffles setting up jet air streams each of which have a parabolic profile with accompanying laminar air streams with side swirls and eddies, which action dispels heavy particles from the center of the parabolic air flow into the outer lamina and into the side swirls and eddies and onto the liquid soaked surfaces of the various perforated baffles where they are liquid bonded and held on said surfaces, thus cleaning the air progressively cleaner as it passes through the series of succeeding perforated baffles, also passing said air into a turbulence chamber where it flows under an upper lid baffle and over a lower outlet baffle in a reverse flow pattern as it passes out of said apparatus, again dispelling any possible remaining heavy contaminants downwardly at said upper baffle by centrifugal, inertial and gravitational forces onto the floor of said turbulence chamber where they are oil bonded on the liquid soaked floor of said turbulence chamber, also concurrently as these processes of removing heavy contaminants are taking place in the air flow any contained submicronic contaminants are also being cast against, or sufficiently near, the various liquid soaked surfaces of the apparatus where surface cohesion and electrostatic attraction occurs and removes and bonds such contaminants from the air stream by virtue of their specific weight and inertial forces, or as a result of their natural ionization and subsequent electrostatic attraction to the surfaces of said apparatus which have opposite polarity.

* * * * *